United States Patent Office.

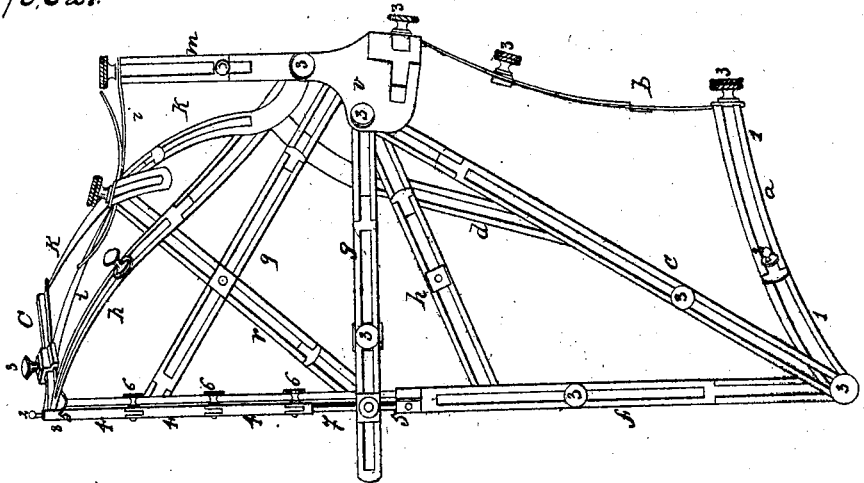
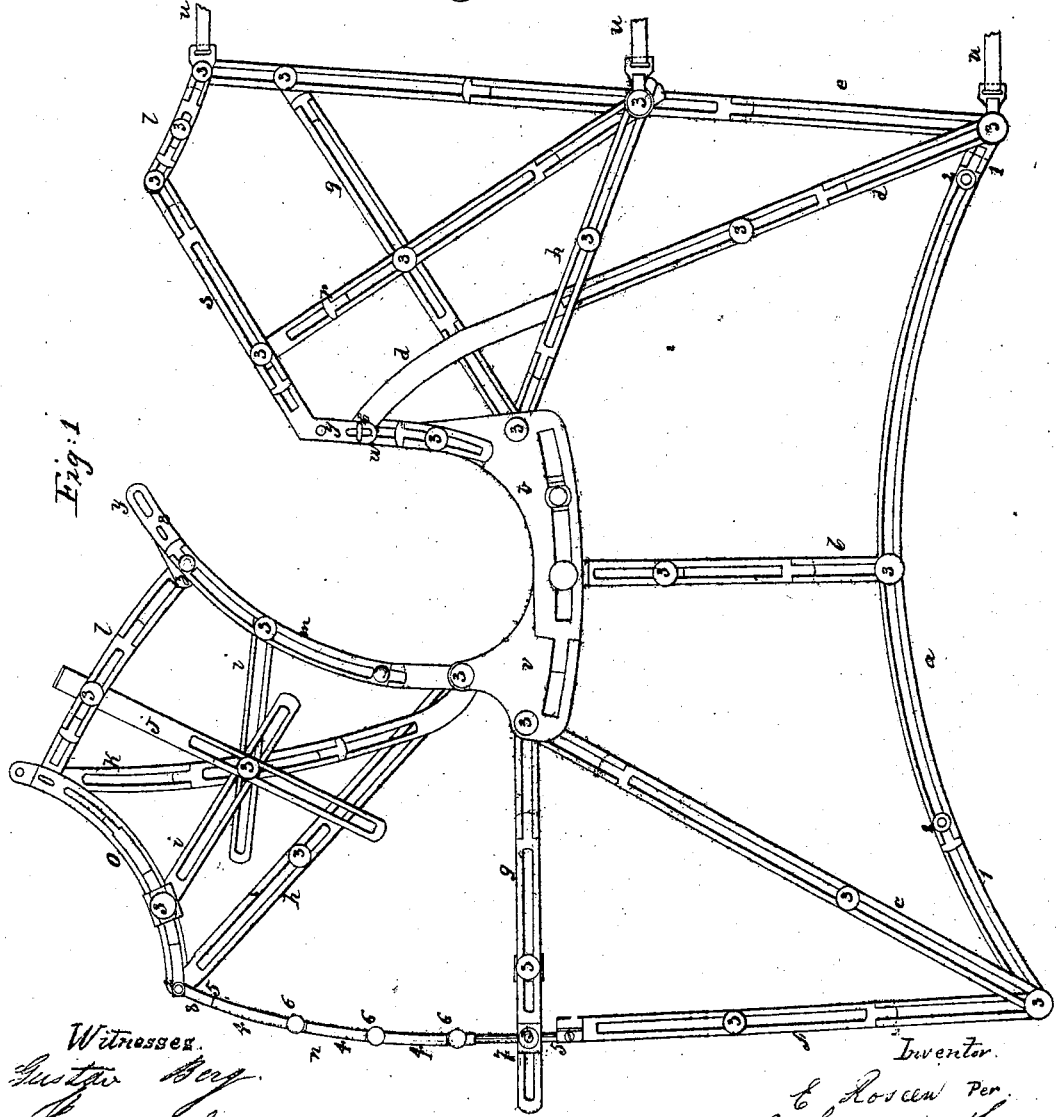

E. ROSEEN, OF NEW YORK, N. Y.

Letters Patent No. 70,621, dated November 5, 1867.

---

IMPROVEMENT IN CONFORMATORS.

---

The Schedule referred to in these Letters Patent and making part of the same.

---

TO ALL WHOM IT MAY CONCERN:

Be it known that I, E. ROSEEN, of the city of New York, in the county and State of New York, have invented a new and useful Improvement in Conformators; and I do hereby declare that the following is a full, clear, and exact description thereof, which will enable those skilled in the art to make and use the same, reference being had to the accompanying drawing, forming part of this specification, in which drawing—

Figure 1 represents a conformator, constructed according to my invention, for the left side of the human form, the apparatus being shown in an open state, and lying upon a plane surface.

Figure 2 is an elevation of the left side of the same apparatus, as it appears when closed and ready to be placed upon and fitted to the person.

This invention relates to adjustable conformators, for measuring the upper part or bust of the human body, and consists in several novel features hereinafter explained.

In the present illustration, the apparatus is constructed and intended to be used for measuring one-half of the body from the left side, the apparatus for measuring the other half being the counterpart of that herein shown.

The letter $a$ designates the lower horizontal bar of the conformator, extending from the front vertical bar $f$ to the rear vertical bar $e$. Said bar $a$ is made in two divisions 1 1, each of which is slotted longitudinally, and they are connected to each other by buttons on the end of each division going through the slot of the other division, and resting on the opposite side thereof, where they serve as fastenings to keep them close together, and also as guides in the adjustments and movements of the divisions upon each other, in shortening or lengthening the bar.

When the adjustment is made, the divisions are held stationary, and secured by means of the clamping-screw 3, which, in the case of said bar $a$, serves to connect the vertical bar $b$ to said bar $a$, as well as to maintain the divisions of the latter stationary and fixed after being adjusted to the measurement which is being taken. The bars $b, c, d, e, f, g, h, i, k, l, m, o, p, q, r, s, t, v$, and $w$, are each composed, like the bar $a$, of divisions similar in construction and arrangement to the divisions 1 1 of that bar, and are provided with set-screws 3, which hold the divisions stationary after they have been adjusted upon each other. These bars are longer or shorter, according to the position occupied by them, and their combination, in conjunction with the other bars hereinafter named, forms a conformator which describes a portion of the outlines of a coat.

The bar $l$ is connected to bar $m$ by a jointed link, $z$, which is pivoted to the bar $m$ in such a manner as to be capable of swinging on its pivot. The set-screw on bar $l$ goes through or is attached to a single supplemental bar, $j$, which extends diagonally across bars $k$ and $i$, to each of which it is connected by a set-screw, 3, which is common to said bars $j$ $k$ $i$, passing through the slots of each, and holding them together. The outer ends of bar $i$ are themselves adjustable in position, being connected respectively to bars $m$ and $o$ by the same set-screws 3 which hold the divisions of the latter in place. This is the case also with several other bars, as, for instance, the bars $b$ and $r$, and one end of bars $g$, $p$, and $q$.

The bars $v$ $v$ form the central portion of the apparatus, from which, and its continuations $w$, $m$, and $s$, many of the bars radiate. The said bars $v$ $v$ are adjustable on each other, in like manner as the other bars, and their upper edges are curved, so that their upper edges form a semicircular figure, of larger or smaller extent, by sliding said bars outwards or inwards. The bars $v$ $v$ come beneath the shoulder of the person being measured, and the bars $w$ and $m$ are curved, to fit respectively the rear and front of the shoulder when they are brought together upon the person. When said bars $w$ and $m$ are brought together, they, in connection with the bars $v$ $v$, form an arm-hole, which embraces the arm next the shoulder, the bars $l$ and $s$ coming over the shoulder, and resting on it, and conforming to its shape.

Those parts of the apparatus shown open in fig. 1 are fastened together by means of a narrow button, $x$, whose stem goes through and fastens to each other the lapped ends of the bars $w$ and $d$, while its head projects above, and receives upon itself the ends of bars $s$ and $m$, into whose slots $y$ $y$ the button passes, and, on being twined at right angles across them, holds said bars, and forms an arm-hole, to receive the arm and shoulder. The bar $j$ projects beyond the bar $l$, and is turned up on its outer end, to form a hook, which passes beneath bar *s* and hooks against its inner edge, while the end of bar *o* is brought beneath the outer end of said bar *s*, and is connected to that bar by the set-screw 3, which attaches together bars *s* and *t*.

When the conformator is thus closed, it is placed upon the person to be measured, and the several bars are adjusted, by extending or contracting them until the exact measurements are found, when the several divisions are locked or secured by means of the set-screws, the conformator being meanwhile secured on the body by means of the straps *u*, which have eyelet-holes in them, that are slipped upon pin-heads 2, which are placed at convenient points on the bars, some of the set-screws 3 being formed with small heads for that purpose. If another conformator is at the same time put on the other side of the body, the straps of one are fastened on the pin-heads of the other.

After the measurements are taken, and the divisions of the bars secured, the button *x* is turned so as to be parallel with slot *y* of the bar *m*, the hook on the end of bar *j* is disengaged from bar *s*, and the screw 3 of that bar is loosed from bar *o*, when the upper portions of the apparatus become capable of being spread out and flattened, as shown in fig. 1, so as to be laid on the material to be cut into garments, and the lines and distances are then readily marked out without mistake.

To enable the curved portions of the apparatus to lie flat down, I make the bars of thin elastic material, except the breast or front bar *n*, which I make as follows: The upper end of said bar *n* is hinged to the adjacent end of bar *o*, but its lower end, which is cylindrical, is connected to the upper end of bar *f* by entering a socket, 5, in which it can turn, but from which it cannot be withdrawn, being retained by a screw whose point enters a groove on rod *n* in a manner well known to mechanics. The intermediate portion of bar *n* is composed of several divisions 4, joined together by hinges 6, which allow them to be bent laterally, so as to give a curve to the bar. The upper division 8 of the bar is connected to the adjacent division 4 by a similar joint, 5, to the one on bar *f*, which allows them to turn on each other.

It follows from this construction, that when the apparatus is flattened out, the bars *n* and *f* turn on each other, and allow the curved bar *n* to come close to the surface on which it is laid, and yet retain the curvature to which it was adjusted.

What I claim as new, and desire to secure by Letters Patent, is—

1. The bar *n*, constructed with joints 5 and hinges 6, so that its curvature can be preserved when the apparatus is flattened out, substantially as described.

2. The adjustable bars *v v*, in combination with the curved bars *m* and *w*, substantially as described.

3. The combination and arrangement of the bar *j*, provided with a hook at its end, the bars *s* and *o*, and the set-screw 3, connecting the bars *s* and *t*, substantially as described.

E. ROSEEN.

Witnesses:
   W. HAUFF,
   GUSTAV BERG.